US008532463B2

(12) United States Patent
Matsunaga

(10) Patent No.: US 8,532,463 B2
(45) Date of Patent: Sep. 10, 2013

(54) PROGRAM RESERVATION DISPLAY SYSTEM AND METHOD

(75) Inventor: Shigeki Matsunaga, Hyogo (JP)

(73) Assignee: Panasonic Corporation, Osaka (JP)

( * ) Notice: Subject to any disclaimer, the term of this patent is extended or adjusted under 35 U.S.C. 154(b) by 531 days.

(21) Appl. No.: 12/598,630

(22) PCT Filed: Mar. 25, 2009

(86) PCT No.: PCT/JP2009/001321
§ 371 (c)(1),
(2), (4) Date: Nov. 3, 2009

(87) PCT Pub. No.: WO2009/125546
PCT Pub. Date: Oct. 15, 2009

(65) Prior Publication Data
US 2010/0146557 A1    Jun. 10, 2010

(30) Foreign Application Priority Data

Apr. 8, 2008   (JP) ................................ 2008-100516

(51) Int. Cl.
*H04N 5/92* (2006.01)
(52) U.S. Cl.
USPC ......................................................... 386/248
(58) Field of Classification Search
USPC ................................................ 386/248, 291
See application file for complete search history.

(56) References Cited

U.S. PATENT DOCUMENTS

| | | | |
|---|---|---|---|
| 2001/0023431 A1* | 9/2001 | Horiguchi | 709/204 |
| 2003/0220100 A1* | 11/2003 | McElhatten et al. | 455/418 |
| 2004/0175150 A1* | 9/2004 | Ando et al. | 386/95 |
| 2005/0185931 A1 | 8/2005 | Isozaki et al. | |
| 2007/0198739 A1* | 8/2007 | Jennings et al. | 709/231 |
| 2007/0216667 A1 | 9/2007 | Matsuda | |
| 2008/0008444 A1 | 1/2008 | Hori | |
| 2010/0030844 A1* | 2/2010 | Miyama et al. | 709/203 |

FOREIGN PATENT DOCUMENTS

| | | |
|---|---|---|
| JP | 2004-336461 | 11/2004 |
| JP | 2005-244372 | 9/2005 |
| JP | 2006-115400 | 4/2006 |
| JP | 2007-158806 | 6/2007 |

OTHER PUBLICATIONS

English Translation of Japan Publication 2004-336461.*
International Search Report issued Jun. 2, 2009 in International (PCT) Application No. PCT/JP2009/001321.
International Preliminary Report on Patentability issued Dec. 9, 2010 in International (PCT) Application No. PCT/JP2009/001321.

* cited by examiner

*Primary Examiner* — Thai Tran
*Assistant Examiner* — William Tran
(74) *Attorney, Agent, or Firm* — Wenderoth, Lind & Ponack, L.L.P.

(57) ABSTRACT

Provided is a network system having connected thereto (i) a plurality of television receivers each having a function for specifying television program reservations, and (ii) a recording device, such that a list of the program reservations configured by all of the television receivers can be viewed on one television receiver. The recording device produces a predefined common reservation code, and sequentially receives and records the program reservation instructions with the common reservation codes in memory. When a list of the reservations is requested by one television receiver, a program reservation instruction is sent from memory with the common reservation code, and a list of reservations is compiled based on the common reservation codes.

2 Claims, 9 Drawing Sheets

| | AAA TV | BBB TV | CCC TV | DDD TV |
|---|---|---|---|---|
| 7:00 | MORNING NEWS  | | | |
| 8:00 | | | | |
| 9:00 | | MOVIE TIME  ~802 | | |
| 10:00 | | | | |
| 11:00 | | | | |
| 12:00 | | | | |
| 13:00 | | | JAPANESE COOKING  | |
| 14:00 | | DRAMA AT 2:00  ~801 | | |
| 15:00 | | | | |
| 16:00 | | | | GOLF LESSON  |
| 17:00 | | | | |

NORMAL RECORDING RESERVATION     AUTOMATIC RECORDING RESERVATION

Fig.1

```
           RECORDING DEVICE 1
           /       |        \
TELEVISION    TELEVISION    TELEVISION
RECEIVER X    RECEIVER Y    RECEIVER Z
```

Fig.2A

| RECORDING TIME | TITLE | RESERVED BY | STATUS |
|---|---|---|---|
| 2/1 7:00-7:15 | MORNING NEWS | TELEVISION RECEIVER X | RESERVATION RECEIVED |
| XXXXXXXXXXX | XXXXXXXXXXX | XXXXXXXXXXX | XXXXXXXXXXX |
| XXXXXXXXXXX | XXXXXXXXXXX | XXXXXXXXXXX | XXXXXXXXXXX |
| | | | |
| | | | |

Fig.2B

| RECORDING TIME | TITLE | RESERVED BY | STATUS |
|---|---|---|---|
| 2/1 7:00-7:15 | MORNING NEWS | TELEVISION RECEIVER X | RESERVATION RECEIVED |
| 2/1 13:00 - 13:30 | JAPANESE COOKING | TELEVISION RECEIVER Y | RESERVATION RECEIVED |
| XXXXXXXXXXX | XXXXXXXXXXX | XXXXXXXXXXX | XXXXXXXXXXX |
| | | | |
| | | | |

Fig.2C

| RECORDING TIME | TITLE | RESERVED BY | STATUS |
|---|---|---|---|
| 2/1 7:00-7:15 | MORNING NEWS | TELEVISION RECEIVER X | RESERVATION RECEIVED |
| XXXXXXXXXXX | XXXXXXXXXXX | XXXXXXXXXXX | XXXXXXXXXXX |
| 2/1 16:00-16:30 | GOLF LESSON | TELEVISION RECEIVER Z | RESERVATION RECEIVED |
| | | | |
| | | | |

Fig.3

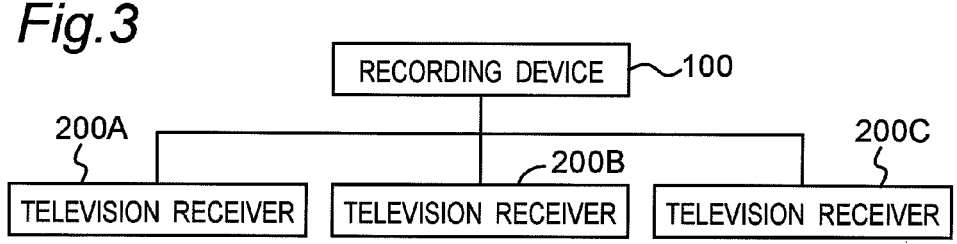

Fig.4A

| RECORDING TIME | TITLE | RESERVED BY | STATUS |
|---|---|---|---|
| 2/1 7:00-7:15 | MORNING NEWS | TELEVISION RECEIVER X | RESERVATION RECEIVED |
| 2/1 13:00 - 13:30 | JAPANESE COOKING | TELEVISION RECEIVER Y | RESERVATION RECEIVED |
| 2/1 16:00-16:30 | GOLF LESSON | TELEVISION RECEIVER Z | RESERVATION RECEIVED |
| | | | |
| | | | |

Fig.4B

| RECORDING TIME | TITLE | RESERVED BY | STATUS |
|---|---|---|---|
| 2/1 7:00-7:15 | MORNING NEWS | TELEVISION RECEIVER X | RESERVATION RECEIVED |
| 2/1 13:00 - 13:30 | JAPANESE COOKING | TELEVISION RECEIVER Y | RESERVATION RECEIVED |
| 2/1 16:00-16:30 | GOLF LESSON | TELEVISION RECEIVER Z | RESERVATION RECEIVED |
| | | | |
| | | | |

Fig.4C

| RECORDING TIME | TITLE | RESERVED BY | STATUS |
|---|---|---|---|
| 2/1 7:00-7:15 | MORNING NEWS | TELEVISION RECEIVER X | RESERVATION RECEIVED |
| 2/1 13:00 - 13:30 | JAPANESE COOKING | TELEVISION RECEIVER Y | RESERVATION RECEIVED |
| 2/1 16:00-16:30 | GOLF LESSON | TELEVISION RECEIVER Z | RESERVATION RECEIVED |
| | | | |
| | | | |

Fig.7A
701

```
<item id="">
    <title> MORNING NEWS </title>
    <class>DIRECT.MANUAL</class>
    <scheduledChannelID>1,11111,111</scheduledChannelID>
    <scheduledStartDateTime>2008-02-01 07:00:00</scheduledStartDateTime>
    <scheduledDuration>00:15:00</scheduledDuration>
</item>
```
704

Fig.7B
702

```
<item id="">
    <title> JAPANESE COOKING </title>
    <class>DIRECT.CDSEPG</class>
    <scheduledCDSObjectID>CDS_item_5</scheduledCDSObjectID>
</item>
```
705

Fig.7C
703

```
<item id="">
    <title> GOLF LESSON </title>
    <class>DIRECT.CDSNONEPG</class>
    <scheduledCDSObjectID>Usr_channel_4</scheduledCDSObjectID>
    <scheduledStartDateTime>MONT16:00:00</scheduledStartDateTime>
    <scheduledDuration>P00:30:00</scheduledDuration>
</item>
```
706

*Fig. 7D*

```xml
<item id="video_item_1">
  <title>MORNING NEWS </title>
  <class>DIRECT.MANUAL</class>
  <scheduledChannelID>1,11111,111</scheduledChannelID>
  <scheduledStartDateTime>2008-02-01 07:00:00</scheduledStartDateTime>
  <scheduledDuration>00:15:00</scheduledDuration>
  <vli:ggChannelID>1,11111,111</vli:ggChannelID>
  <vli:ggPprogramID>123</vli:ggPprogramID>
</item>
<item id="video_item_2">
  <title> JAPANESE COOKING </title>
  <class>DIRECT.CDSEPG</class>
  <scheduledCDSObjectID>CDS_item_5</scheduledCDSObjectID>
  <vli:ggChannelID>2,22222,222</vli:ggChannelID>
  <vli:ggPprogramID>456</vli:ggPprogramID>
</item>
<item id="video_item_3">
  <title> GOLF LESSON </title>
  <class>DIRECT.CDSNONEPG</class>
  <scheduledCDSObjectID>Usr_channel_4</scheduledCDSObjectID>
  <scheduledStartDateTime>MONT16:00:00</scheduledStartDateTime>
  <scheduledDuration>P00:30:00</scheduledDuration>
  <vli:ggChannelID>3,33333,333</vli:ggChannelID>
  <vli:ggPprogramID>789</vli:ggPprogramID>
</item>
```

707, 704, 708, 705, 708, 706, 708

Fig. 8
| | AAA TV | BBB TV | CCC TV | DDD TV |
|---|---|---|---|---|
| 7:00 | MORNING NEWS  | | | |
| 8:00 | | | | |
| 9:00 | | MOVIE TIME [RESERVED] | ⌐802 | |
| 10:00 | | | | |
| 11:00 | | | | |
| 12:00 | | | | |
| 13:00 | | | JAPANESE COOKING  | |
| 14:00 | | DRAMA AT 2:00  | ⌐801 | |
| 15:00 | | | | |
| 16:00 | | | | GOLF LESSON [RESERVED] |
| 17:00 | | | | |
 NORMAL RECORDING RESERVATION  [RESERVED] AUTOMATIC RECORDING RESERVATION

PROGRAM RESERVATION DISPLAY SYSTEM AND METHOD

BACKGROUND OF THE INVENTION

The present invention relates to a system and a method for displaying recording reservations for broadcast television programs on a home network.

Home network systems in which a plurality of television receivers or a plurality of computers (reservation clients) are connected to a single recording device (recording server) are increasingly used in homes. An example of such a home network system is shown in FIG. 1.

In FIG. 1 the recording device 1 is a recording server connected to television receivers X, Y, Z. Each of the television receivers X, Y, Z is a reservation client with a program recording reservation function.

Various methods of selecting the program to be recorded when programming a particular program for recording ("program selection method") are known from the literature. These include the following four common types.

(1) Direct channel (direct manual)
(2) Direct CDS EPG
(3) Direct CDS NONEPG
(4) Direct program code The first method, (1) direct channel (direct manual), uniquely specifies the program to be recorded by the recording client by specifying information that uniquely identifies the channel, such as the channel tuning number, the recording start time, and the recording time (how long recording is to continue).

When the recording server has a function for presenting electronic program guide (EPG) information based on the DLNA guidelines by program unit, the second method, (2) direct CDS EPG, can be used to uniquely specify the program to be recorded using the program identification information (CDS Item ID) of the desired program by causing the reservation client to search for the CDS Item ID of the desired program using the content search command ("CDS:Browse command" below) of the Content Directory Service (CDS), which is defined according to the DLNA (Digital Living Network Alliance) guidelines.

When the recording server has a function for presenting electronic program guide (EPG) information based on the DLNA guidelines by channel unit, the third method, (3) Direct CDS NONEPG, can be used to uniquely specify the program to be recorded by causing the reservation client to search for the virtual channel ID (CDS Item ID) of the broadcasting station that broadcasts the program to be recorded using the CDS:Browse command, and specifying the virtual channel ID (CDS Item ID), recording start time, and recording time.

When a third-party organization assigns a unique ID to each program and publishes these ID numbers in a newspaper, magazine, or other forum, the fourth method, (4) direct program code, can be used to uniquely identify the program to be recorded by the reservation client specifying the unique program ID number (Program Code) of the desired program.

In this example television receiver X has the first reservation function (1) described above, television receiver Y has reservation functions (1) and (2), and television receiver Z has reservation functions (1) and (3). The recording device enables programming recording reservations using methods (1), (2), and (3).

It is also assumed that the user has reserved recording a morning news program on television receiver X using method (1), has reserved recording a Japanese cooking program on television receiver Y using method (2), and has reserved recording a golfing lesson program on television receiver Z using method (3). Reservation information for these three programs is sent to and received by the recording device 1. More specifically, the reservation clients, that is, television receivers X, Y, Z, send an SRS (Scheduled Recording Service) reservation command (SRS:CreateRecordSchedule) conforming to DLNA guidelines to the recording device 1 using a protocol defined in SOAP (Simple Object Access Protocol). As a response to the SRS reservation command, the recording device 1 sends a reservation ID and recording reservation completion information including recording address information to the corresponding reservation client, and executes the reserved recording when the reservation time arrives.

When the user tries to view a list of all recording reservations received by the recording device 1 on the screen of television receiver X, a list of all recording reservations can be seen by the television receiver X creating and sending an SRS reservation list acquisition command to the recording device 1 using the SOAP protocol, receiving a recording reservation list in response, and displaying the received recording reservation list. Normally, however, the program reservation information in the reservation list is returned in the form of the information that is specified in reservation methods (1), (2), and (3) above when the recording is programmed by television receivers X, Y, Z. Therefore, because television receiver X only has reservation function (1), only the program information that is reserved using reservation function (1) can be viewed. As a result, the recording reservation for the morning news show that was reserved by television receiver X can be confirmed, but the reservations for the Japanese cooking show and the golf lesson program cannot be confirmed (FIG. 2A).

Likewise, if the user tries to view a list of all recording reservations received by the recording device 1 on the screen of television receiver Y, only the information for the morning news show and the Japanese cooking program that were reserved using reservation functions (1) and (2) can be seen because television receiver Y only has recording reservation functions (1) and (2) (FIG. 2B).

Further likewise, if the user tries to view a list of all recording reservations received by the recording device 1 on the screen of television receiver Z, only the information for the morning news show and the golf lesson program that were reserved using reservation functions (1) and (3) can be seen because television receiver Z only has recording reservation functions (1) and (3) (FIG. 2C).

See, for example, Japanese Patent Publication No. JPA-2005-244372.

As described above, because the program selection methods that each reservation client can use or understand differ according to the model, a television receiver that is compatible only with particular program selection methods cannot view all of the reservation information issued by television receivers X, Y, Z that are compatible with different program selection methods.

SUMMARY OF THE INVENTION

The present invention therefore enables viewing on one television receiver all reservation information received by the recording device.

A first aspect of the invention is a network system having connected thereto a plurality of reservation devices each having a function for specifying television program reservations, and at least one recording device. The recording device has a common reservation code generator that generates predefined common reservation codes in response to program reservation instructions sent from the reservation devices, and memory for sequentially receiving and storing program reservation instructions together with the common reservation codes. Each of the reservation devices has a request output device that outputs a reservation list request, a reservation instruction receiver that receives all program reservation instructions including a common reservation code sent from the recording device based on the reservation list request, a reading device that reads only common reservation codes from the program reservation instructions, and a reservation list generator that generates a reservation list using common reservation codes.

A second aspect of the invention is a method of displaying a reservation list in a network system having connected thereto a plurality of reservation devices each having a function for specifying television program reservations, and at least one recording device, including in the recording device steps of generating predefined common reservation codes in response to program reservation instructions sent from the reservation devices, and sequentially receiving and storing program reservation instructions together with the common reservation codes; and including in each of the reservation devices steps of outputting a reservation list request, receiving all program reservation instructions including a common reservation code sent from the recording device based on the reservation list request, reading only common reservation codes from the program reservation instructions, and generating a reservation list using common reservation codes.

The reservation device may be any device with a reservation function, including, for example, television receivers, recording devices, cell phones, and personal computers.

Effect of the Invention

Because the recording device produces reservation information using a common reservation code in the invention, any television receiver (referred to as "the television receiver") that is connected to the network and can read the common reservation codes can display a list of all programs that have been reserved, including programs that are reserved using a program selection method with which the television receiver is not compatible but with which another television receiver connected to the network is compatible.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a block diagram of a network system according to the related art.

FIG. 2A is a sample screen display showing a list of recording reservations displayed on a television receiver according to the related art.

FIG. 2B is a sample screen display showing a list of recording reservations displayed on another television receiver according to the related art.

FIG. 2C is a sample screen display showing a list of recording reservations displayed on a yet another television receiver according to the related art.

FIG. 3 is a block diagram of a network system according to the invention.

FIG. 4A is a sample screen display showing a list of recording reservations displayed on a television receiver according to the invention.

FIG. 4B is a sample screen display showing a list of recording reservations displayed on another television receiver according to the invention.

FIG. 4C is a sample screen display showing a list of recording reservations displayed on yet another television receiver according to the invention.

FIG. 7A shows an example of a recording reservation information command from a television receiver 200A.

FIG. 7B shows an example of a recording reservation information command from a television receiver 200A.

FIG. 7C shows an example of a recording reservation information command from a television receiver 200A.

FIG. 7D shows an example of recording reservation list information.

FIG. 8 shows an example of a recording reservation list.

DETAILED DESCRIPTION OF THE PREFERRED EMBODIMENTS

Figure 5A:
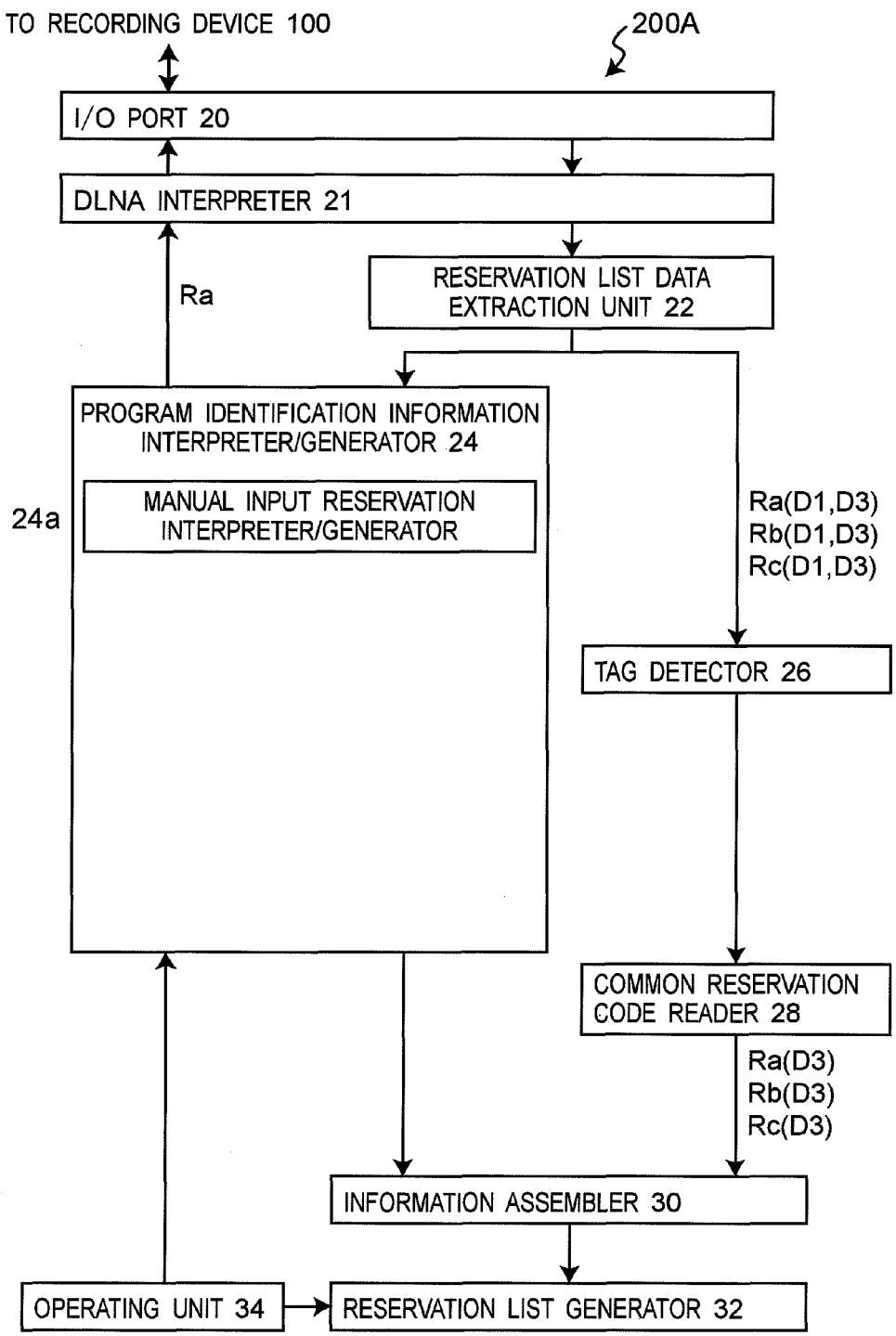
FIG. 5A is a block diagram of the part of a television receiver according to the invention that is related to the recording reservation function.

A system for displaying program recording reservations according to the present invention is used in a network system having a plurality of reservation clients connected to at least one reservation server.

The reservation server is a device with a function for recording video signals received from a tuner and signals input from an external input terminal, and is comparable to devices such as video decks, hard disk drive/DVD recorders, personal computers, cell phones, software programs, and other such constructions.

Embodiment 1

FIG. 3 shows a network system having a program recording reservation display system according to the invention. In FIG. 3 reference numeral 100 denotes a recording device, and reference numerals 200A, 200B, and 200C denote television receivers. When the television receivers are considered generically, they are denoted television receiver 200.

Each of the television receivers 200A, 200B, and 200C has at least one type of program recording reservation function. For example, in the embodiment described below, television receiver 200A has a reservation function that uses program selection method (1) described above, television receiver 200B has a reservation function that uses program selection methods (1) and (2) described above, and television receiver 200C has a reservation function that uses program selection methods (1) and (3) described above. Note that these reservation functions are used by way of example only, and other reservation functions may be used.

Figure 5B:
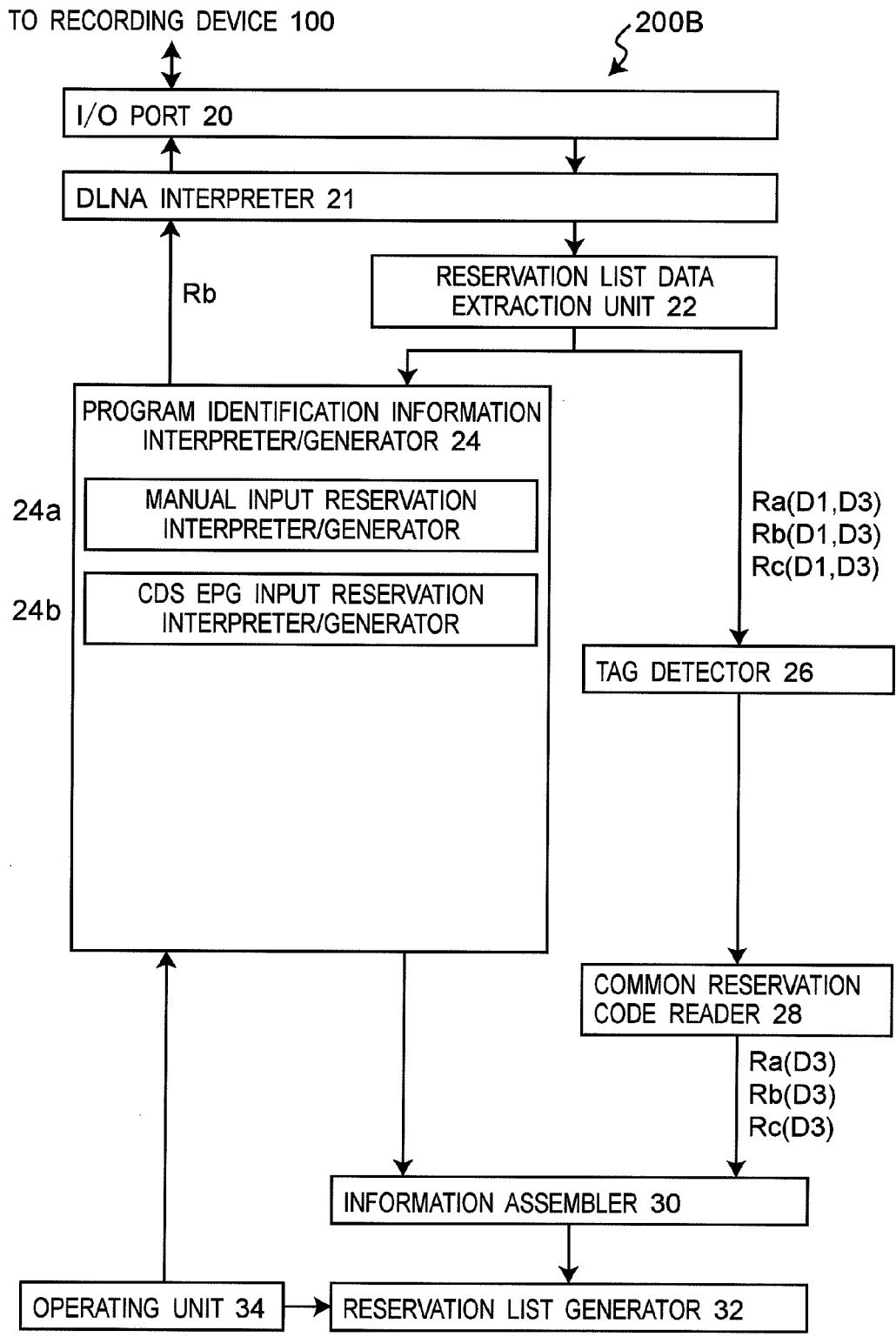
FIG. 5B is a block diagram of the part of another television receiver according to the invention that is related to the recording reservation function.
Figure 5C:
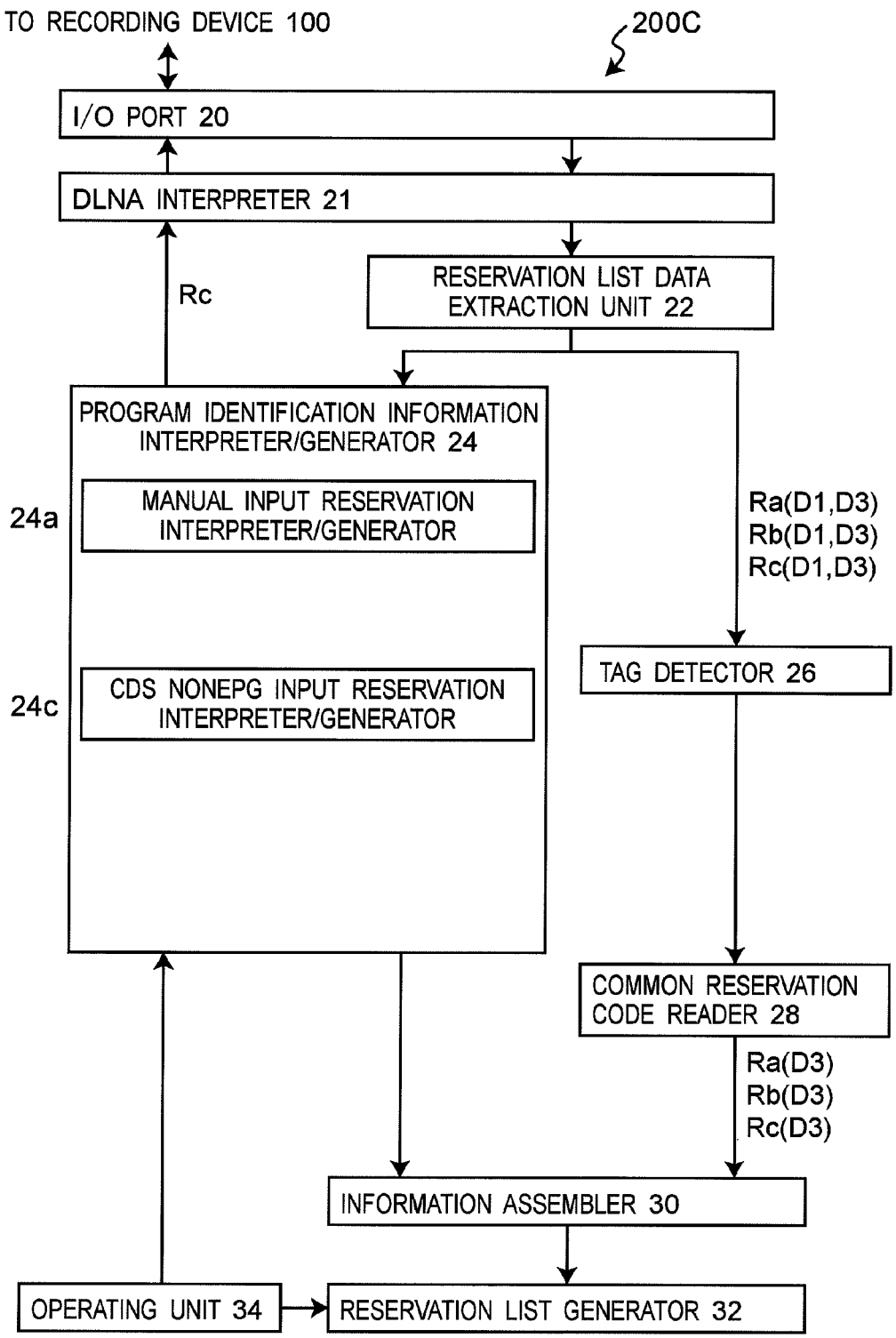
FIG. 5C is a block diagram of the part of yet another television receiver according to the invention that is related to the recording reservation function.

FIG. 5A, FIG. 5B, and FIG. 5C show television receiver 200A, television receiver 200B, and television receiver 200C, respectively, with a recording reservation device according to the invention.

Each of the television receivers 200A, 200B, and 200C has an input/output port 20, DLNA interpreter 21, reservation list data extraction unit 22, program identification information interpreter/generator 24, tag detector 26, common reservation code reader 28, information assembler 30, reservation list generator 32, and operating unit 34.

The operating unit 34 has, for example, a GUI screen drawing controller (not shown in the figure) and a remote control receiver (not shown in the figure) for the television receiver, draws an electronic program guide and program identification information input screen, sends program reservation operations from a remote control device for reserving a program selected from the electronic program guide to the program identification information interpreter/generator 24, and instructs the program identification information interpreter/generator 24 to configure a program recording reservation based on program identification information (input information such as the channel number, recording start time, recording time, and recording image quality) input by the user.

Because television receiver 200A is compatible only with program selection method (1), only a manual input reservation interpreter/generator 24a is rendered in the program identification information interpreter/generator 24.

Because television receiver 200B has two reservation functions, the (1) direct channel (direct manual) method and the (2) direct CDS EPG (DIRECT CDSEPG) method, both a manual input reservation interpreter/generator 24a and a CDS EPG input reservation interpreter/generator 25b are rendered in the program identification information interpreter/generator 24.

Furthermore, because television receiver 200C has two reservation functions, the (1) direct channel (direct manual) method and the (2) direct CDS NONEPG (DIRECT CDS-NONEPG) method, both a manual input reservation interpreter/generator 24a and CDS NONEPG input reservation interpreter/generator 25c are rendered in the program identification information interpreter/generator 24.

In the situation described below a recording reservation for the morning news show has been programmed by the user inputting the channel number of the station that broadcasts the desired morning news program, the date and time that the morning news program starts, and the broadcast time, that is, how long the morning news program is broadcast (referred to as the "program length"), by the operating unit 34. The manual input reservation interpreter/generator 24a shown in FIG. 5A compiles reservation code data Ra(D1) (SRS service compatible) based on the manually input data, and the DLNA interpreter 21 generates an SRS:CreateRecordSchedule command from the compiled reservation code data Ra(D1) and sends the SRS:CreateRecordSchedule command through the I/O port 20 to the recording device 100.

Based on the DLNA guidelines, the television receiver 200B acquires the electronic program guide information from the recording device 100 using the CDS:Browse command, and displays the EPG information as an electronic program listing on the operating unit 34. When the user selects and programs recording the Japanese cooking program, for example, using the electronic program guide displayed by the operating unit 34, the program identification information (CDS Item ID) for the selected show is extracted from the CDS:Browse command response and passed to the CDS EPG input reservation interpreter/generator 24b shown in FIG. 5B. The CDS EPG input reservation interpreter/generator 24b compiles reservation code data Rb(D1) based on the program identification information (CDS Item ID), and the DLNA interpreter 21 generates an SRS:CreateRecordSchedule command from the compiled reservation code data Rb(D1) and sends the SRS:CreateRecordSchedule command through the I/O port 20 to the recording device 100.

Based on the DLNA guidelines, the television receiver 200C then acquires the electronic program guide information from the recording device 100 using the CDS:Browse command, and displays the channel information acquired by the operating unit 34 as a channel listing. When the user selects the channel on which the golf lesson program is broadcast from the channel list presented by the operating unit 34 and enters a recording reservation for the broadcasting time, the virtual channel ID (CDS Item ID) of that channel is executed from the response to the CDS:Browse command and passed together with the broadcast time information to the CDS NON EPG input reservation interpreter/generator 24c shown in FIG. 5C. The CDS NONEPG input reservation interpreter/generator 24c then compiles reservation code data Rc(D1) based on the CDS NONEPG input from the virtual channel ID (CDS Item ID) and broadcast time, and the compiled reservation code data Rc(D1) is sent as the SRS:CreateRecordSchedule command through the I/O port 20 to the recording device 100 by the DLNA interpreter 21.

FIG. 7A, FIG. 7B, and FIG. 7C respectively show examples of the recording reservation information compiled as XML document objects (SRS Document) in the SRS:CreateRecordSchedule command when the recordings were reserved by television receivers 200A, 200B, and 200C.

FIG. 7A shows the recording reservation information 701 that is compiled in television receiver 200A. The recording reservation information 701 is the recording reservation information for the morning news program indicated by the reservation code data Ra(D1) shown in FIG. 5A. As described above, because reservations by the television receiver 200A are based on the direct channel (direct manual) method (1), the program scheduled for recording (the "recording reservation program") is identified by an information object 704 combining information (class element) indicating that the program selection method (1) was used, information (scheduledChannelID element) identifying the channel, the recording start time (scheduledStartDateTime element), and the recording time (scheduledDuration element).

FIG. 7B shows the recording reservation information 702 that is compiled in television receiver 200B. The recording reservation information 702 is the recording reservation information for the Japanese cooking program indicated by the reservation code data Rb(D1) shown in FIG. 5B. As described above, because reservations by the television receiver 200B are based on the direct CDS EPG (DIRECT CDSEPG) method (2), the recording reservation program is identified by an information object 705 combining information (class element) indicating that program selection method (2) was used, and the program identification information (CDS Item ID) (scheduledCDSObjectID element) assigned to each program by the recording device 100, which is a DLNA server. Note that the program identification information (CDS Item ID) is acquired by the television receiver 200B, that is, the DLNA client, searching for the program as the DLNA content.

FIG. 7C shows the recording reservation information 703 that is compiled in television receiver 200C. The recording reservation information 703 is the recording reservation information for the golf lesson program indicated by the reservation code data Rc(D1) shown in FIG. 5C. As described above, because reservations by the television receiver 200C are based on the direct CDS NONEPG (DIRECT CDSNON-EPG) method (3), the recording reservation program is identified by an information object 706 combining information (class element) indicating that program selection method (3)

was used, the virtual channel ID (CDS Item ID) (scheduled-CDSObjectID element) that is assigned to each channel by the recording device 100, which is a DLNA server, the recording start time (scheduledStartDateTime element), and the recording time (scheduledDuration element). Note that the virtual channel ID (CDS Item ID) is acquired by the television receiver 200C, that is, the DLNA client, searching for the channel as DLNA content.

Figure 6:
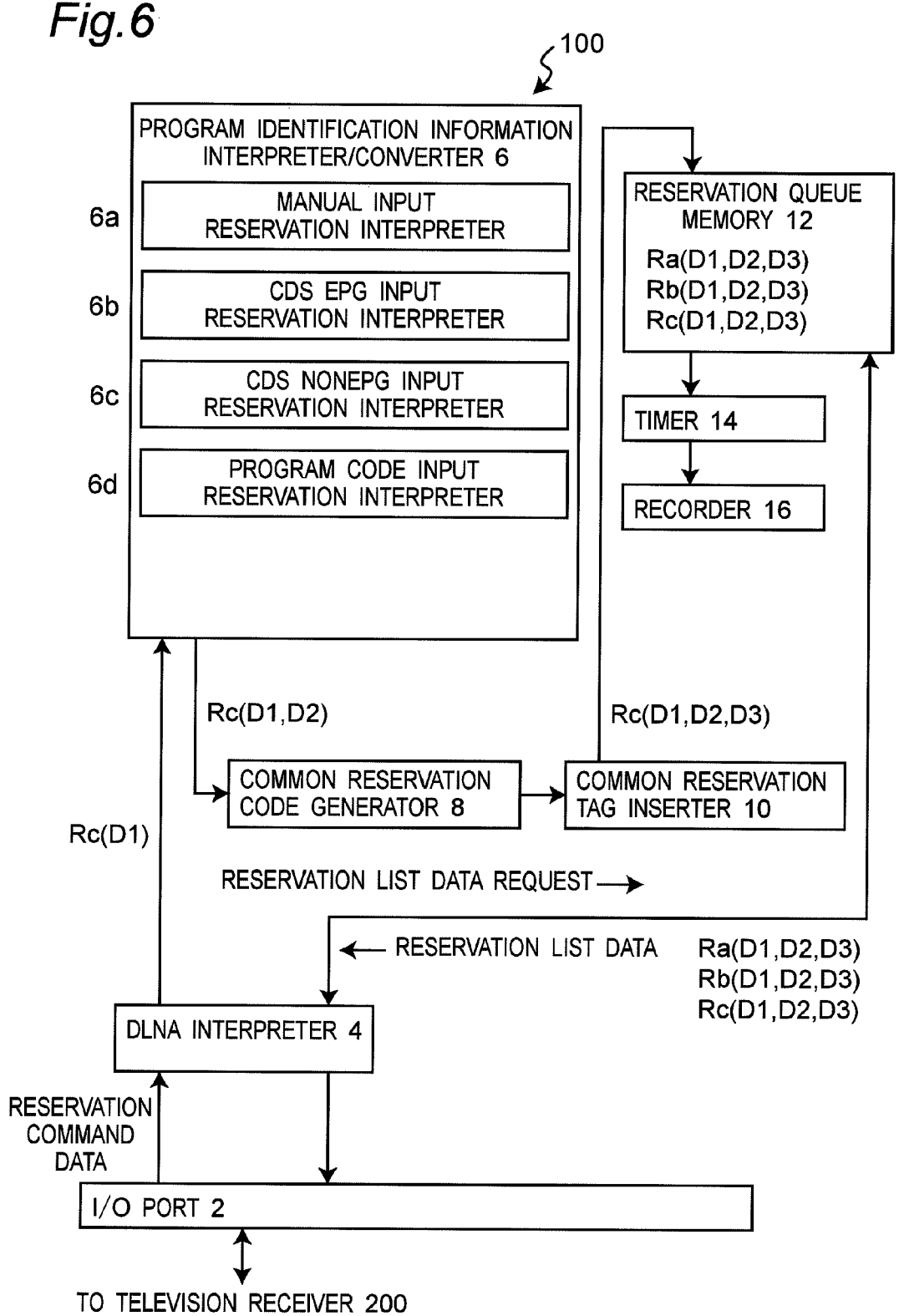
FIG. 6 is a block diagram of a recording device according to the invention.

FIG. 6 shows a recording device 100 that has a recording reservation device according to the invention. The recording device 100 has an input/output (I/O) port 2, a DLNA interpreter 4, a program identification information interpreter/converter 6, a common reservation code generator 8, a common reservation tag inserter 10, reservation queue memory 12, a timer 14, and a recorder 16.

Note that in the example described below a recording reservation for the morning news program is set on television receiver 200A, a recording reservation for the Japanese cooking program is set on television receiver 200B, and then a reservation for the golf lesson program is set on television receiver 200C.

The DLNA interpreter 4 interprets the SOAP command received through the I/O port 2, and outputs the result to the program identification information interpreter/converter 6 or reservation queue memory 12. For example, if reservation code data Rc(D1) is received by the SRS:CreateRecordSchedule command from the television receiver 200C, the reservation code data Rc(D1) is extracted from the SRS:CreateRecordSchedule command and the extracted reservation code data Rc(D1) is output to the program identification information interpreter/converter 6. For example, if the reservation list acquisition command SRS:BrowseRecordSchedules is received from the television receiver 200C, a reservation list data acquisition command is output to the reservation queue memory 12.

The program identification information interpreter/converter 6 interprets the reservation code data Rc(D1) to extract the program identification information, converts the program identification information to tuner information and recording timer information for the recording device 100, and stores the tuner information and recording timer information in the reservation queue memory 12. Note that various interpreting units are rendered in the program identification information interpreter/converter 6. In the example shown in FIG. 6, the program identification information interpreter/converter 6 has four interpreting units, that is, a manual input reservation interpreter 6a, a CDS EPG input reservation interpreter 6b, a CDS NONEPG input reservation interpreter 6c, and a program code input reservation interpreter 6d.

Because the reservation code data Rc(D1) was generated based on the direct CDS NONEPG (DIRECT CDSNONEPG) method (3), the reservation code data Rc(D1) is interpreted by the CDS NONEPG input reservation interpreter 6c. An appropriate identification code or flag is set in the reservation code data Rc(D1) so that the method used to program the reservation can be identified.

The CDS NONEPG input reservation interpreter 6c of the program identification information interpreter/converter 6 compiles data including the tuner information, which is the original data, and data related to the reservation code data converted to recording timer information as reservation code data Rc(D1, D2). Note that (D1) is a program identifier ID used in program selection method (3), and (D2) is the recording reservation information required for the recording device 100 to actually start recording after conversion and includes such recording parameters as tuner information, recording timer information, and image quality setting. Parameter D1, which is the program identification information that is specified when a reservation is made by television receiver 200C, which is a reservation client, and the recording reservation information parameter D2 after conversion, are both added to the reservation code data Rc(D1, D2).

The common reservation code generator 8 converts the interpreted/converted recording reservation information to a common reservation code, and produces common reservation code D3. The common reservation code D3 may use the program identifier ID output by any single method used by the interpreters 6a to 6d, such as program selection method (1) that specifies the program using the channel number, recording start date/time, and recording time, or a code output by a method other than those used by interpreters 6a to 6d may be used. The reservation code converted to a common reservation code is denoted by parameter D3. Service information SI including an identifier for identifying the broadcast channel (network_id, transport_id, service_id), and an identifier (event_id) for identifying the program, are set as the common reservation code.

The common reservation tag inserter 10 adds a common reservation tag to the common reservation code generated by the common reservation code generator 8, that is, parameter D3. An identification flag or identification mark such as the identifier ID may be added instead of a common reservation tag. The reservation code data including the common reservation tag is denoted Rc(D1, D2, D3). Note that one or both of parameters D1 and D2 may be omitted from the reservation code data output from the common reservation tag inserter 10.

The reservation code data received from the television receivers 200A, 200B, and 200C is stored sequentially in the reservation queue memory 12. Note that in the example described below reservation code data Ra(D1, D2, D3) and Rb(D1, D2, D3) are already recorded, and a third reservation described by reservation code data Rc(D1, D2, D3) is then added. Parameters D1, D2, and D3 are parameters with different formats, but each is a parameter including at least such information as the reservation channel, the reservation start time, and the reservation end time (or program duration information).

The timer 14 checks the recording start date/time in parameter D2 of each reservation code data entry recorded in the reservation queue memory 12. When the time kept by the timer 14 reaches the recording start date/time in any reservation code data Ra, Rb, Rc entry, the channel number, recording time, and recording parameters are sent to the recorder 16 based on the information in parameter D2, and recording the program starts through a tuning and receiving means (not shown in the figure) such as the tuner of the recording device 100.

An operation whereby a reservation list is produced using all reservation information is described next. An operation for viewing all reservation information on television receiver 200C is described first.

A reservation list data request for compiling a reservation list is output by the operating unit 34 shown in FIG. 5C. More specifically, the SRS:BrowseRecordSchedules command, which is a reservation list acquisition command, is sent to the recording device 100. This request is sent through the DLNA interpreter 4 and I/O ports 20 and 2 to the reservation queue memory 12 (FIG. 6). The method of the related art returns only parameter D1 from each reservation code data entry as the response to the reservation list acquisition command. In this embodiment of the invention, however, each of the parameters D1, D2, D3 is sent from all reservation code data entries Ra(D1, D2, D3), Rb(D1, D2, D3), and Rc(D1, D2, D3)

retrieved from the reservation queue memory 12 as the response to the reservation list acquisition command.

FIG. 7D shows an example of the recording reservation list information in the SRS:BrowseRecordSchedules response sent from the recording device 100 as the response to the reservation list acquisition command. A common reservation code 708 (equivalent to parameter D3) is included in the recording reservation list document 707. Program identification information 704 to 706 (equivalent to parameter D1) is included in the recording reservation list document 707 in addition to the common reservation codes 708.

Note, also, that in addition to the programs reserved for recording by the television receivers 200A, 200B, and 200C, programs reserved for recording by the recording device 100 may also be included in the recording reservation list document 707. Because reservations programmed on the recording device 100 are not based on the SRS:CreateRecordSchedule command, they are managed using only the information contained in the common reservation code 708 or as a reservation set by directly specifying the channel, and are thus a combination of the common reservation code 708 and information with the same format as program identification information 704.

The response is sent through I/O ports 2 and 20 and the DLNA interpreter 21 to the reservation list data extraction unit 22. The reservation list data extraction unit 22 extracts reservation code data parameters D1 and D3, which contain the reservation list data, from the response packets to the reservation list acquisition request command (SRS:BrowseRecordSchedules). The tag detector 26 detects the common program identification information tags in the extracted parameter D3. The common reservation code reader 28 reads the common program identifier ID that is identified by the detected common reservation tags. As a result, the reservation code group Ra (D3), Rb (D3), Rc (D3) denoted by parameter D3 only in the common reservation code is output from the common reservation code reader 28.

The information assembler 30 assembles the data required for the reservation list using parameter D3 of the common reservation code in the reservation code group.

The reservation list generator 32 produces and displays a list of all reservations on screen (FIG. 4C). As shown in FIG. 4C, when the reservation list is viewed on television receiver 200C, all of the programs that were reserved by television receiver 200A and television receiver 200B, including programs that are reserved using reservation functions that are not available on television receiver 200C, can be viewed in addition to the programs (a golf lesson show in this example) that were reserved on the television receiver 200C. More specifically, because the reservation list is produced using parameter D3 of the common reservation code, all recording reservations can be viewed regardless of the television receiver 200 and regardless of the reservation method used to program the recordings.

FIG. 8 shows an example of a recording reservation list. The recording reservation list includes shows that are reserved by the recording device 100 for recording, such as "Drama at 2:00" in this example, instead of displaying only the programs for which recording reservations are programmed by the television receivers. Note, further, that programs reserved for recording may be indicated by highlighting 801 in the case of normal recording reservations, and by reverse highlighting 802 in the case of automatic recording reservations. A normal recording reservation as used herein refers to programs for which recording reservations are programmed individually, and an automatic recording reservation refers to recording reservations that are programmed once to record one segment of an on-going series, such as Star Trek, with the ensuing segments then automatically programmed for recording. Automatic recording reservations can also be programmed based on the user's viewing history.

Note, also, that automatic recording reservation programs may be omitted from the displayed recording reservation list even if the recording reservation information is received as a SOAP response, for example.

If automatic recording reservations and normal recording reservations are prioritized on the recording device 100, whether recording is possible may be determined based on the available recording capacity of the recording device 100 when a recording reservation command for an automatic recording reservation program is received, for example.

Furthermore, when an automatic recording reservation is programmed, a normal recording reservation is then added by the user, and at least part of the recording times of the automatic recording reservation and the normal recording reservation overlap or there is not enough recording capacity to complete the recordings, the normal recording reservation may be given priority and the recording time of the automatic recording reservation may be shortened, for example.

Further alternatively, when the available recording capacity becomes insufficient, automatic recording reservation programs may be deleted or automatically recorded programs that have been left unseen for a long time may be automatically deleted.

Note that the reservation operation is described above using a television receiver by way of example, but devices other than television receivers, such as recording devices, cell phones, personal computers, and other devices connected to the network can also execute the reservation operation. Devices that can execute the reservation operation are "reservation devices."

Note, further, that the reservation list data can also be viewed using the method of the related art on the television receiver 200C. In this situation, when the display mode of the reservation list data is changed to the conventional mode, the data from the reservation list data extraction unit 22 is sent to the program identification information interpreter/generator 24, and only the reservation list data corresponding to existing reservation functions can be seen. In this case only programs that are reserved by functions corresponding to the reservation functions of the television receiver 200C appear in the reservation list.

An operation for viewing all reservation information on the television receiver 200C is described above. By executing the same process on television receiver 200A and television receiver 200B, however, all reservation lists from television receiver 200A to television receiver 200C can be compiled and displayed (see FIG. 4A and FIG. 4B).

In this embodiment of the invention the recording device 100 sends a common reservation code to the television receiver 200A to 200C as the response to reservation list acquisition command. Alternatively, however, the common reservation code generator 8 may generate a DLNA public ID and send the DLNA public ID with the common reservation code as the response. By sending the CDS:Browse command, which is a CDS (Content Delivery Service)-standard information acquisition command for acquiring content information (DIDL: Digital Item Declaration Language) corresponding to the DLNA public ID, to the recording device 100, the television receiver 200A to 200C in this case can acquire the content information and URL for the content in response. As a result, the reservation completion status can be checked based on the acquired content information and URL. For example, it can be determined that recording failed if the response to the CDS service acquisition command is an error, and it can be determined that recording failed if the recording time in the content information is short.

Furthermore, the television receivers 200A to 2000 may store past electronic program guide information for a specified period of time, and the DLNA public ID may be additionally displayed when past electronic program guide information is displayed.

Alternatively, whether or not recording is possible may be determined using a CDS service acquisition command, and the result of determining whether recording was a success or failure may be displayed in the past electronic program guide information instead of displaying the DLNA public ID. As a result, recorded programs can be reproduced easily using only the electronic program guide.

Application In Industry

The present invention can be used in a network system interconnecting a plurality of television receivers and at least one recording device.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A network system provided in a user end for receiving television programs, said network system comprising:
    a plurality of reservation devices connected to the network system in the user end; and
    at least one recording device connected to the network system in the user end,
    wherein each respective reservation device, of the plurality of reservation devices, performs at least one program selection method of a plurality of different program selection methods, each program selection method, of the plurality of different program selection methods, having a specific function for carrying out television program reservations and producing a program reservation instruction in one format of a plurality of formats intrinsic to each program selection method of the plurality of different program selection methods,
    wherein the at least one recording device comprises:
        a common reservation code generator operable to generate a predefined common reservation code in response to the program reservation instruction in the one format of the plurality of formats produced and sent from any reservation device of the plurality of reservation devices; and
        a memory operable to sequentially receive and store program reservation instructions produced by the plurality of reservation devices together with the predefined common reservation codes generated by the common reservation code generator, and
    wherein, each respective reservation device of the plurality of reservation devices comprises:
        a request output device operable to output a reservation list request;
        a reservation instruction receiver operable to receive all of the program reservation instructions and the generated common reservation codes sent from the recording device based on the output reservation list request;
        a reading device operable to read only the generated common reservation codes; and
        a reservation list generator operable to generate a reservation list using the common reservation codes read by the reading device.

2. A method of displaying a reservation list in a network system provided in a user end for receiving television programs, the network system including a plurality of reservation devices connected to the network system in the user end and at least one recording device connected to the network system in the user end, such that each respective reservation device, of the plurality of reservation devices performs at least one program selection method of a plurality of different program selection methods, each program selection method, of the plurality of different program selection methods, having a specific function for carrying out television program reservations and producing a program reservation instruction in one format of a plurality of formats intrinsic to each program selection method of the plurality of different program selection methods, said method comprising:
    in the at least one recording device:
        generating a predefined common reservation code in response to the program reservation instruction in the one format of the plurality of formats produced and sent from any reservation device of the plurality of reservation devices; and
        sequentially receiving and storing program reservation instructions produced by the plurality of reservation devices together with predefined common reservation codes generated by said generating; and
    in each respective reservation device of the plurality of reservation devices:
        outputting a reservation list request;
        receiving all of the program reservation instructions and the generated common reservation codes sent from the recording device based on the output reservation list request;
        reading only the generated common reservation codes; and
        generating a reservation list using the common reservation codes read by said reading.

* * * * *